United States Patent
Kikuchi et al.

[11] Patent Number: 6,021,573
[45] Date of Patent: Feb. 8, 2000

[54] IN-LINE OSCILLATING CAM ASSEMBLY

[75] Inventors: Naoki Kikuchi, Chandler, Ariz.; John Everett Nemazi, Bloomfield Hills, Mich.

[73] Assignee: Ryobi North America, Inc., Anderson, S.C.

[21] Appl. No.: 08/857,029

[22] Filed: May 15, 1997

[51] Int. Cl.[7] .................................................. B27B 11/02
[52] U.S. Cl. ........................... 30/392; 30/393; 30/394; 74/55
[58] Field of Search ..................... 30/392, 393, 394; 74/55; 83/776

[56] References Cited

U.S. PATENT DOCUMENTS

| | | |
|---|---|---|
| Re. 15,756 | 2/1924 | Michell . |
| 2,211,741 | 8/1940 | Elwell . |
| 2,856,782 | 10/1958 | Lee . |
| 3,405,563 | 10/1968 | Whisner . |
| 3,728,902 | 4/1973 | McCaughey . |
| 3,807,242 | 4/1974 | Stone . |
| 3,916,702 | 11/1975 | Nelson . |
| 3,942,251 | 3/1976 | Griffies et al. ........................ 30/394 X |
| 3,952,604 | 4/1976 | Baudler . |
| 4,020,555 | 5/1977 | Hedrick ..................................... 30/392 |
| 4,145,811 | 3/1979 | Kendzior ................................... 30/394 |
| 4,289,041 | 9/1981 | Valdespino .................................. 74/56 |
| 4,550,501 | 11/1985 | Moores, Jr. et al. ..................... 30/393 |
| 4,699,036 | 10/1987 | Henne ................................... 30/392 X |
| 4,834,033 | 5/1989 | Larsen ....................................... 123/58 |
| 4,884,344 | 12/1989 | Martinez et al. .......................... 30/394 |
| 5,083,376 | 1/1992 | Lentino ...................................... 30/392 |
| 5,099,705 | 3/1992 | Dravnieks . |
| 5,205,043 | 4/1993 | Batt et al. ................................... 30/393 |
| 5,212,887 | 5/1993 | Farmerie .................................... 30/393 |
| 5,301,562 | 4/1994 | Seto ....................................... 30/394 X |
| 5,511,912 | 4/1996 | Ellerbrock ................................. 408/20 |
| 5,598,636 | 2/1997 | Stolzer .................................... 30/394 |

FOREIGN PATENT DOCUMENTS

| | | |
|---|---|---|
| 499265 | 6/1930 | Germany . |
| 620909 | 10/1935 | Germany . |

*Primary Examiner*—M. Rachuba
*Assistant Examiner*—T. Anthony Vaughn
*Attorney, Agent, or Firm*—Brooks & Kushman P.C.

[57] ABSTRACT

An in-line oscillating cam assembly which includes a housing, a cam shaft having a longitudinal axis, and a pair of eccentric drive cams longitudinally spaced apart from each other and mounted on the cam shaft eccentrically out of phase. The pair of drive cams have opposed circumferential chamfered surfaces oriented at an inclined angle relative a plane perpendicular to the longitudinal axis of the cam shaft. The cam shaft is supported upon the housing and is also rotatable about the longitudinal axis. Further included in the assembly is a follower shaft spaced apart from and parallel to the drive shaft, and a cam follower longitudinally fixed to the follower shaft and extending between the pair of drive cams. The cam follower has a pair of opposed frustoconical follower-surfaces engaging the chamfered surfaces of the pair of drive cams. Thus, rotating one of the cam shaft and follower shaft causes the other one of the cam shaft and follower shaft to axially oscillate.

16 Claims, 8 Drawing Sheets

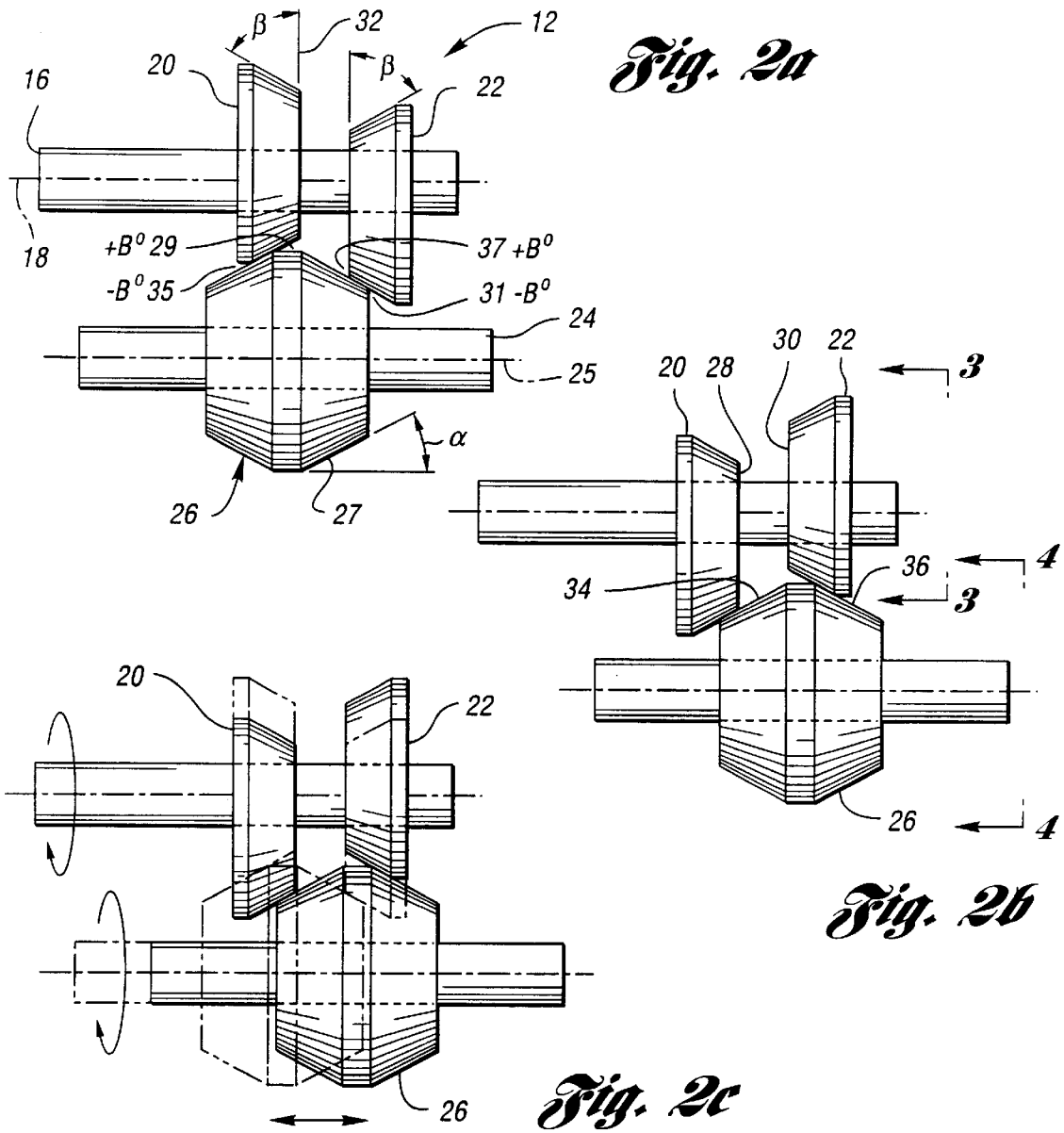

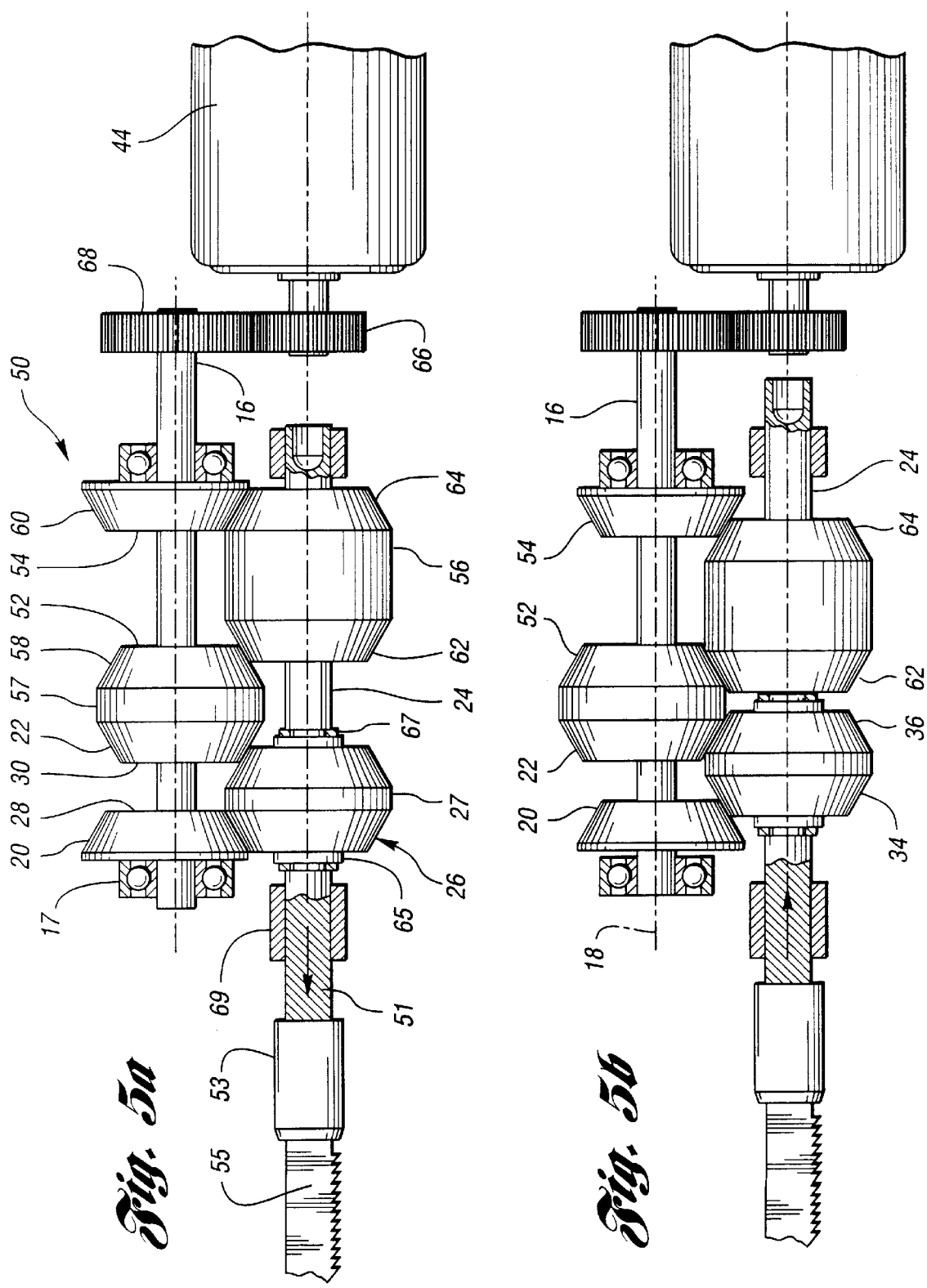

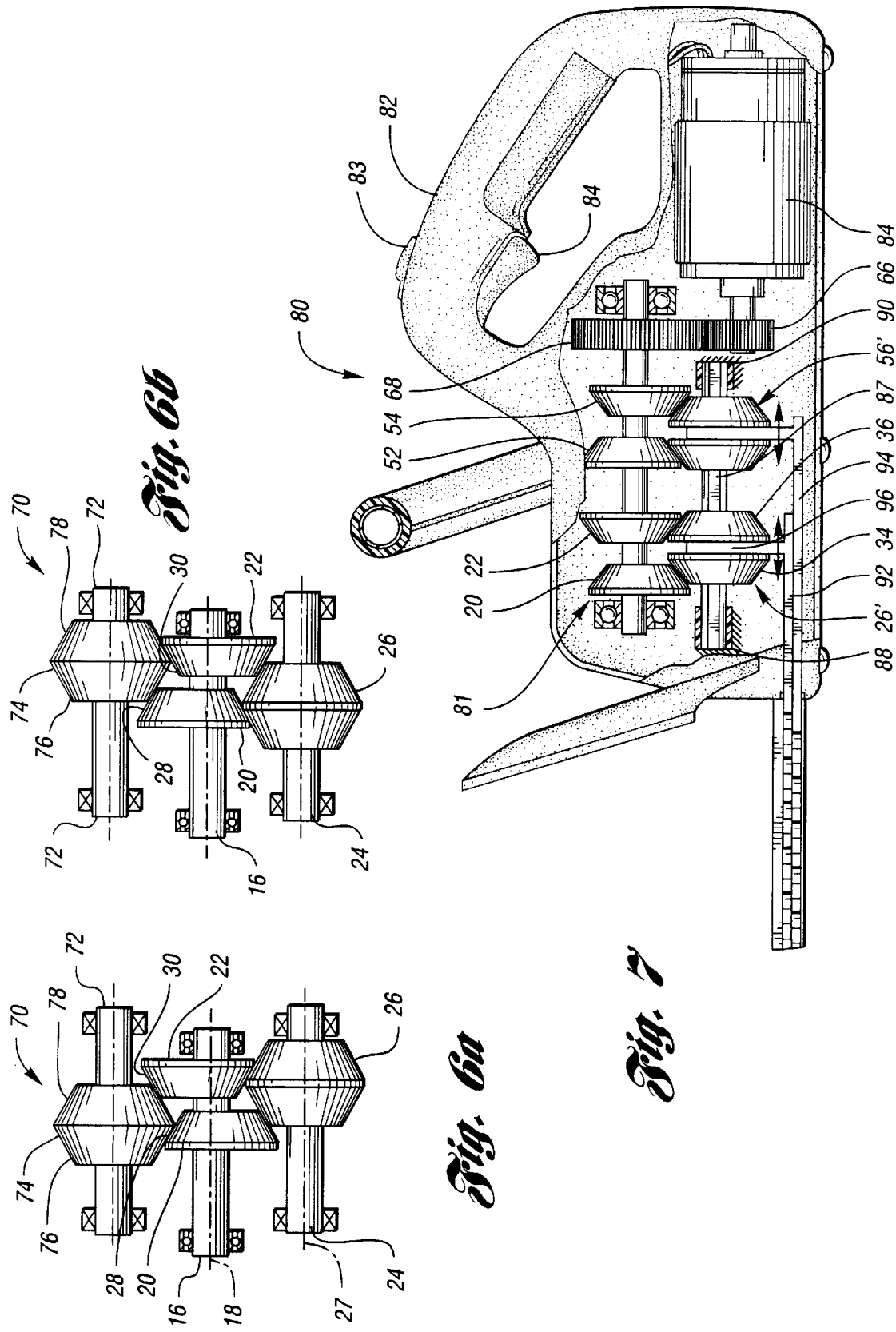

IN-LINE OSCILLATING CAM ASSEMBLY

TECHNICAL FIELD

This invention relates to an in-line oscillating cam assembly for providing axial oscillation to an output shaft.

BACKGROUND ART

Generally, in-line mechanisms involve the concept of a first rotating member effecting a reciprocating or oscillating movement upon a second output member. In-line mechanisms currently exist in various forms, such as the slope slot mechanism, the eccentric mechanism, and the rocked bearing mechanism. Each of these mechanisms involves a pair of shafts wherein each of the pair of shafts (a drive shaft and an output shaft) is set parallel to the other. In each type of in-line mechanism, the drive shaft rotates imparting a reciprocating motion to the output shaft via mating components on each shaft which impart force vectors on each other.

For example, the sloped-slot mechanism involves a drive shaft having a rotating component with sloped groove thereon for receiving a protrusion fixed on a second output shaft. As the drive shaft rotates, the protrusion rides along the sloped-slot causing the output shaft to reciprocate. On the other hand, the eccentric mechanism involves a pair of bevel gears mounted on shafts having axes perpendicular to each other, the first gear rotating on a drive shaft axis which rotates the second gear. The second gear has a shaft eccentrically mounted to the output shaft, thereby reciprocally moving the output shaft. Finally, in the rocked bearing mechanism, the drive shaft rotates within a raked bearing which has an end mounted to the output shaft. When the drive shaft rotates, it causes the raked bearing end to swing like a pendulum, thereby causing the output shaft to move in a reciprocating fashion.

While the above described in-line mechanisms allow the output shaft to move in a reciprocating motion with respect to the rotating drive shaft, none of them permit the output shaft to be easily rotated without a special device. Moreover, none of the above in-line mechanisms are capable of having multiple output shafts surrounding the drive shaft.

Consequently, a need has developed for an in-line assembly having an output shaft that can rotate, as well as reciprocate, without a special mechanism. Further, the in-line assembly should be capable of accommodating multiple out-put shafts around or about the input shaft. This in-line assembly should also be fairly inexpensive to manufacture compared to other types of in-line mechanisms.

SUMMARY OF THE INVENTION

Accordingly, it is a principle object of the present invention to provide an in-line assembly wherein the output shaft can be rotated with respect to the drive shaft without special means.

It is another object of the present invention to provide an in-line assembly capable of having more than one output shaft for the drive shaft.

It is still another object of the present invention to provide an in-line assembly for providing an in-line layout between the power source and the assembly, allowing for a compact assembly.

Still further, it is an object of the present invention to provide an in-line assembly which is less expensive to manufacture than present designs.

It is yet another object of the present invention to provide an in-line assembly which is adaptable for use in various applications, power tool and otherwise.

In carrying out the above objects, features and advantages of the present invention, there is provided an in-line assembly comprising a housing, a cam shaft having a longitudinal axis, and a pair of eccentric drive cams mounted on the cam shaft eccentrically out of phase to each other. The pair of cams are preferably longitudinally spaced apart from each other on the cam shaft. The pair of drive cams have opposed circumferential chamfered surfaces oriented at an inclined angle relative a plane perpendicular to the longitudinal axis of the cam shaft. The cam shaft is supported upon the housing and is rotatable about the longitudinal axis. Further included in the assembly is a follower shaft which is spaced apart from the cam shaft and set parallel thereto. Also included is a cam follower longitudinally fixed to the follower shaft and extending between the pair of drive cams. The cam follower has a pair of opposed follower-surfaces which engage the chamfered surfaces of the pair of drive cams. Thus, when one of either the cam shaft and follower shaft is rotated, this rotation causes the other one of the cam shaft and follower shaft to axially oscillate.

In one embodiment, the assembly further includes a pair of eccentric balance cams, each of which is mounted on the cam shaft eccentrically out of phase longitudinally spaced from the other and also spaced apart from the pair of drive cams. Each balance cam further has an opposed circumferential chamfered balance-surface inclined relative to a plane between the balance cams and perpendicular to the longitudinal axis of the drive shaft. This embodiment further includes a balance cam follower rotatable about the follower shaft and extending between the balance cams. The balance cam follower has a pair of opposed frustoconical balance surfaces, each engaging a corresponding one of the chamfered balance-surfaces of the pair of balance cams. Thus, the balance cam follower is able to axially oscillate in a longitudinal direction opposite the cam follower in order to counter balance a reaction force generated by oscillation of the cam follower.

And in yet another embodiment, the assembly includes a balance shaft which is spaced apart from and parallel to the drive shaft. The balance shaft is positioned on a side of the cam shaft opposite the follower shaft. This embodiment has a balance cam follower which is rotatable about the balance shaft and extends between the pair of drive cams. Like the previously summarized embodiment, this balance cam follower has a pair of chamfered balance-surfaces, each engaging a corresponding one of the chamfered surfaces of the pair of drive cams. Thus, when the cam shaft is rotated, this causes the balance cam follower to axially oscillate in a longitudinal direction opposite to the direction of the cam follower.

Additionally, there is provided an in-line assembly for use in a power tool and having a power input for rotating one of the cam shaft and the follower shaft. The other one of the shafts has a mating member coupled to thereby serving as an output shaft for driving an oscillating tool attached thereto The above objects and other objects, features, and advantages of the present invention are readily apparent from the following detailed description of the best modes for carrying out the invention when taken in connection with the accompanying drawings wherein like reference numerals correspond to like components.

BRIEF DESCRIPTION OF THE DRAWINGS

FIG. 2a is a side view of the first embodiment of the in-line oscillating cam assembly according to the present invention;

FIG. 2b is a side view of the one embodiment of an in-line oscillating cam assembly shown in FIG. 2a after 180° rotation of either shaft;

FIG. 2c is a composite illustration of FIGS. 2a and 2b, with FIG. 2a shown in phantom;

FIG. 3 is a front view of a pair of drive cams according to the present invention, taken along the line 3—3 of FIG. 2b;

FIG. 4 is a front view of a cam follower according to the present invention, taken along the line 4—4 of FIG. 2b;

FIG. 5a is a second embodiment of an in-line oscillating cam assembly according to the present invention illustrating the assembly in an extended position;

FIG. 5b is the second embodiment of the in-line oscillating cam assembly according to the present invention illustrating the assembly of FIG. 5a in an retracted position;

FIG. 6a is a third embodiment of an in-line oscillating cam assembly according to the present invention illustrating the assembly;

FIG. 6b is the third embodiment of the in-line oscillating cam assembly according to the present invention illustrating the assembly of FIG. 6a after 180° rotation of the cam shaft;

FIG. 7 illustrates a cut-away view of a hedge trimmer incorporating an embodiment of the in-line oscillating cam assembly according to the present invention;

FIG. 8b illustrates a sanding pad for use with the portable sanding tool shown in FIG. 8a;

FIG. 8c illustrates a sanding rod implement for use with the sanding tool of FIG. 8a;

FIG. 8d illustrates a carving tool implement for use with the sanding tool of FIG. 8a;

FIG. 12b illustrates a perspective view of the fourth embodiment of the follower shaft shown in FIG. 12a;

BEST MODES FOR CARRYING OUT THE INVENTION

Figure 1:
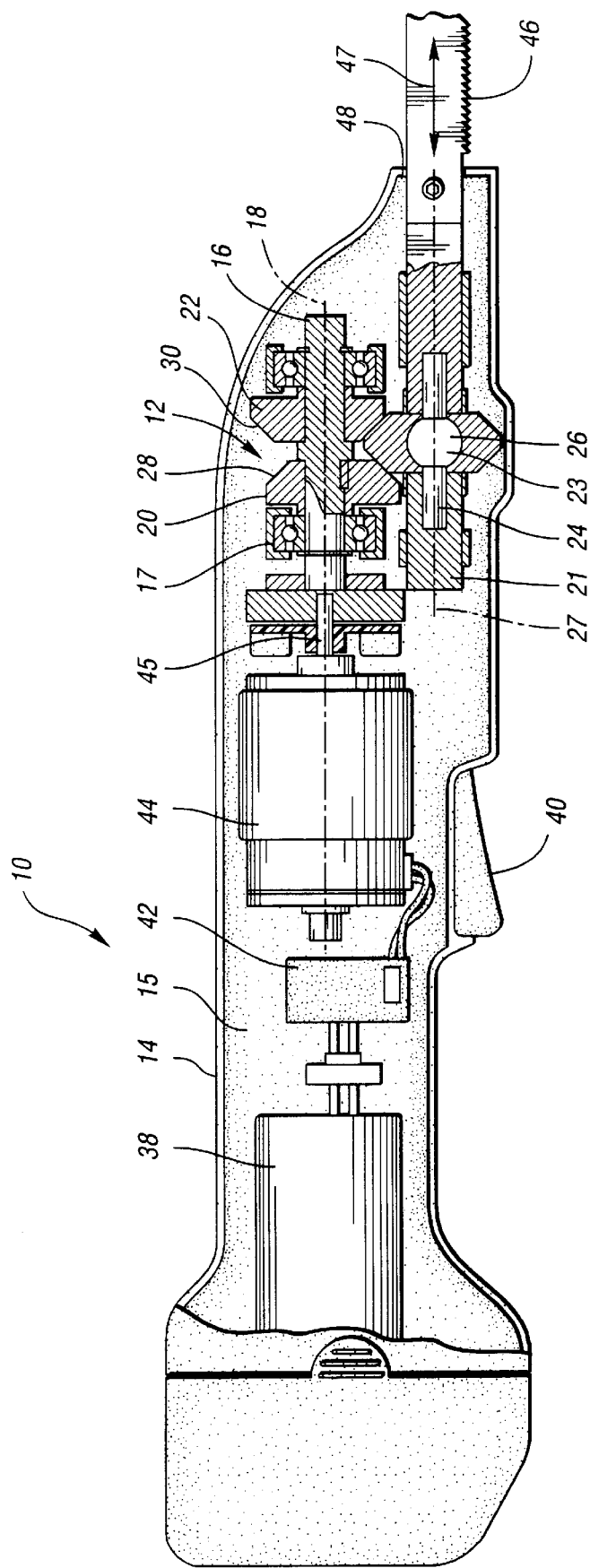
FIG. 1 is a side cut away view of a power reciprocating saw incorporating a first embodiment of the in-line oscillating cam assembly according to the present invention.

With reference directed to FIG. 1 of the drawings, illustrated therein is one example of a power tool 10 incorporating an in-line oscillating cam assembly 12 according to the present invention. The power tool 10 shown in FIG. 1 is a portable reciprocating saw. However, as is readily shown herein with reference to additional FIGS. 7–11 and their accompanying text, the varieties of power tools capable of accommodating any of the embodiments of the in-line oscillating cam assembly according to the present invention, are limited only by the imagination, and not size, shape or complexity of design.

Power tool 10 generally, and in-line oscillating cam assembly 12 specifically, include a number of parts and components as shown in FIG. 1 and in greater detail in FIGS. 2a–c. In-line oscillating cam assembly 12 includes a cam shaft 16 (or generally a drive shaft) having a longitudinal axis 18, a pair of drive cams 20 and 22, a follower shaft 24, and follower member 26. Cam shaft 16 is rotatably mounted or otherwise supported upon housing 14, generally through the use of bearings 17 which allow cam shaft 16 to rotate in relation to housing 14. Cam shaft 16 is rotatable about its longitudinal axis 18, as detailed herein in association with FIGS. 2a–c. Pair of drive cams 20 and 22 are preferably eccentric, although they could also have a traditional nautilus-shaped cam profile, or other shape feasible to achieve the goals and objectives of the present invention. Pair of drive cams 20 and 22 are preferably longitudinally spaced apart along the length of drive shaft 24 as shown in FIGS. 2a–2c. Further, pair of drive cams 20 and 22 are mounted on cam shaft 16 eccentrically out of phase. Specifically the phase differentials between drive cams 20 and 22 are shown herein in FIGS. 2a, 2b, and 2c.

Pair of drive cams 20 and 22 are mounted on cam shaft 16 eccentrically out of phase with each other as shown more fully in FIGS. 2c and 3, herein. Drive cams 20 and 22 are also shown as being longitudinally spaced apart from each other on cam shaft 16, as shown in FIGS. 1 and 2a–c. However, it is contemplated that, in some circumstances, drive cams 20 and 22 may not be spaced apart but instead may contact each other when axially oriented on the shaft.

As previously discussed, power tool 10 includes housing 14, which is typically formed of molded plastic. Housing 14 has a cavity 15 therein for holding a battery 38, a motor 44, and a switch 42, each of which is supported by housing 14. Trigger 40 is mounted to housing 14 and in electrical communication with switch 42 for activating switch 42, thereby causing battery 38 to generate power which causes motor 44 to operate inline oscillating cam assembly 12 according to the present invention. Further shown in FIG. 1 are the additional components applicable when in-line oscillating cam assembly 12 is adapted for use in power tool 10. In operation, trigger 40 is depressed, actuating a switch 42, thereby creating a loop, causing a battery 38 to generate the energy which runs motor 44. In FIG. 1, this energy causes motor shaft 45 to rotate.

Motor shaft 45 is coupled to cam shaft 16, therefore causing cam shaft 16 to rotate. This rotation of cam shaft 16 results in the rotation of drive cams 20 and 22 which are affixed thereto. Because of the angles of the mating surfaces explained more fully herein in association with FIGS. 2a–c, drive cams 20 and 22 impart a force vector upon follower member 26 (in this instance, cam follower 27) mounted on follower shaft 24, causing follower shaft 24 to oscillate transversely. More particularly in power tool 10, follower member 26 is shown rotatable about a roller ball 23 having a cylindrical connector shaft 23 extend from each side and coupled at each end to a flat shaft portion 21. A flat output shaft, such as flat-on-shaft portion 21 is used in those tools where rotation of the implement 46 during is not desired, such as knife implement 46 (or saw blade). The flat-on-shaft portion 21 is prevented from rotating during use by camming out on a non-circular opening 48 in housing 14. This transverse oscillation causes knife implement 46 to move back and forth through an implement opening 48 in housing 14, as designated by arrow 47, so that power tool 10 may perform its desired function.

With reference now to FIG. 2a of the drawings, illustrated therein is a simplified in-line oscillating cam assembly 12 similar to that shown in FIG. 1 (but without housing 14 and related components of power tool 10 previously described). Specifically, FIG. 2a shows assembly 12 in a first resting or retracted position wherein drive cam 20 is directly out of phase with drive cam 22. When assembly 12 of FIG. 1 exhibits the orientation shown in FIG. 2a, cutting blade implement 46 would be at its most retracted state. FIG. 2b then shows assembly 12 of FIG. 2a after one of either the cam shaft 14 or the follower shaft 24 has been rotated 180°. Thus, when assembly 12 of FIG. 1 exhibits the orientation shown in FIG. 2b, cutting blade implement 46 ia at its most extended state. Note that in this fully extended position of FIG. 2b, the drive cams 20 and 22 are still out of phase with each other, but having an orientation opposite to that shown in FIG. 2a.

For ease of reference, FIG. 2c is a composite diagram of FIG. 2a and 2b overlaid showing the relative movement of the assembly 12, wherein FIG. 2a is shown in phantom. FIG. 3 illustrates a front view of each of the pair of drive cams 20 and 22 in the orientation shown in FIG. 2b, taken at an angle perpendicular to longitudinal axis 18 of cam shaft 16 taken along line 3—3. FIG. 3 illustrates the eccentric nature of drive cams 20 and 22, as well as provides another view of drive cams 20 and 22 when operating out of phase with each other. FIG. 4 is a front view of cam follower 27 taken on a plane perpendicular to a longitudinal axis 25 of follower shaft 24, taken along the line 4—4 of FIG. 2b. Cam follower 27 is positioned on follower shaft 24 at its center.

With further reference to FIGS. 1, 2a, 2b and 2c, pair of drive cams 20 and 22 have opposed circumferential chamfered surfaces 28 and 30 oriented at an inclined angles β29 and 31 (respectively discussed herein as angles +β° and −β°) relative a plane 32 perpendicular to longitudinal axis 18 of cam shaft 16. In preliminary studies, assembly 12 has been shown to function adequately when β° is within the range between 30° and 45°. However, based on the proposed applications for the in-line oscillating cam assembly 12, it is contemplated that the desired β° can be operable within the range between 20° and 70°, and preferably in a range between 40° and 69°. Again, drive cams 20 and 22, assembly 12 shown in FIGS. 2a and 2b are 180° eccentrically out of sync with the other. The pair of drive cams 20 and 22 have opposed circumferential chamfered surfaces 28 and 30, respectively. Again, chamfered surfaces 28 and 30 are oriented at an inclined angle β° relative a plane 32 perpendicular to longitudinal axis 18 of cam shaft 16. Of course, the sum of angles a α+β should optimally and preferably equal 90° so that the line contact can be maintained for the drive cam surfaces and the cam follower surface.

Assembly 12 also includes a follower shaft 24 which is spaced apart from cam shaft 16. Follower shaft 24 is also parallel to cam shaft 16. Further follower shaft 24 has a longitudinal axis 25 around which it rotates. Additionally, a follower member 26 is mounted to follower shaft 24. Follower member 26 in this embodiment is shown as a cam follower 27. Cam follower 27 is longitudinally fixed to follower shaft 24. Cam follower 27 further extends between pair of drive cams 20 and 22, thereby engaging each one of the pair of drive cams 20 and 22. Cam follower 27 also includes a pair of opposed follower surfaces 34 and 36 which particularly engage chamfered surfaces 28 and 30, respectively, of pair of drive cams 20 and 22. Specifically, cam follower 27 as shown in FIGS. 1–2 includes a pair of opposed frustoconical follower-surfaces 34 and 36, each of which engages a corresponding one of chamfered surfaces 28 and 30 of pair of drive cams 20 and 22. Follower surfaces 34 and 36 are inclined at angles −β° and +β°, corresponding, respectively, to mating chamfered surfaces 28 and 30 having inclined angles +β° and −β°. Angle β in this embodiment is shown as 60°.

In operation, when one of the cam shaft 16 and follower shaft 24 is rotated (i.e. acts as a drive shaft), it causes the other of the cam shaft 16 and follower shaft 24 (i.e. acting as an output shaft) to axially oscillate due to resultant force vectors of drive cams 20 and 22 acting on cam follower 27 as they rotate out of phase with respect to each other. This aspect is illustrated in FIGS. 2a and 2b. FIG. 2a shows assembly 10 in a first phase while FIG. 2b shows assembly 10 in a second phase after either of the cam shaft 16 or follower shaft 24 has been rotated 180°. Again, for ease of comparison, FIG. 2c shows a combined FIGS. 2a and 2b, with FIG. 2a shown in phantom. Specifically, in FIGS. 1–2, cam shaft 16 is rotated thereby imparting oscillating motion to follower shaft 24. With reference to FIGS. 12a–b and 13–15 discussed herein, various types of follower members 26 may exist, in addition to cam follower 27 shown in FIGS. 1 and 2a–c. In a majority of situations, cam shaft 16 is rotated thereby imparting oscillating motion to follower shaft 24 via interaction of drive cams 20 and 22 with cam follower 27. However, it is fully contemplated that in most situations, such as the one designated in FIGS. 2a–c, follower shaft 24 may itself rotate and serve as the drive shaft, thereby imparting oscillatory motion to cam shaft 16.

FIGS. 5a and 5b illustrate a second embodiment according to the present invention which utilizes a counter balance employed primarily for offsetting resultant vibration commonly found in heavy-duty applications, such as those involving large machinery or those designed to perform work on larger or harder objects. Common components between this embodiment and the previous embodiment illustrated in FIG. 1 will be designated by like reference numerals or like reference numeral having prime (') designations. Thus, shown in this embodiment is in-line oscillating cam assembly 50. This assembly 50 includes cam shaft 16 having longitudinal axis 18, a pair of drive cams 20 and 22 having opposed surfaces 28 and 30, follower shaft 24 and follower member 26 (specifically cam follower 27) having frustoconical opposed surfaces 34 and 36. Note that each of the pair of drive cams 20 and 22 also has a frustoconical shape. Cam follower 27 is free to rotate around follower shaft 24, but is axially fixed in position of follower shaft 24 by thrust washers 65 and snap-rings 67 located at either end. Due to its axially fixed nature, the force exhibited on cam follower 27 conveys an oscillating movement to corresponding follower shaft 24. Follower shaft 24, on the other hand, is constrained from rotating, but is free to axially oscillate in bushings 69. Follower shaft 24 is coupled to a flat on shaft output portion 51 having a chuck 53 mounted thereon for holding and driving blade implement 55. In operation, cam shaft 16 is driven by a motor 44 via planetary gears 66 and 68 sized and arranged to achieve optimum gear reduction.

Further reflected in FIGS 5a and 5b and included in assembly 50 is a pair of balance cams 52 and 54 and a balance cam-follower 56. Like pair of drive cams 20 and 22, pair of balance cams 52 and 54 are preferably eccentric and are longitudinally spaced apart from each other and from pair of drive cams 20 and 22. Balance cams 52 and 54 are longitudinally mounted (along with drive cams 20 and 22) on cam shaft 16 eccentrically out of phase with each other. Balance cams 52 and 54 have opposed circumferential chamfered balance surfaces 58 and 60, respectively. Each balance-surface 58 and 60 is inclined, respectively, at angles $+\beta°$ and $-\beta°$, which are identical to inclined angles $\beta$ of chamfered surfaces 28 and 30, previously discussed. Balance-surfaces 58 and 60 correspond respectively to opposed balance cam follower surfaces 62 and 64, and are inclined at $-\beta$ and $+\beta°$, respectively.

As shown in FIGS. 5a–b, balance cam 52 and drive cam 22 are attached by way of a connection member 57, thus showing cams 52 and 22 operating in phase as a single unit but performing different functions (i.e. acting upon different cam followers). However, it is recognized that balance cam 52 and drive cam 20 do not need to be coupled together in order to be performed their desired functions according to the present invention. These cams just need to be affixed to cam shaft and rotate therewith.

Also included in the embodiment shown in FIGS. 5a–5b is a balance cam follower 56 rotatable about follower shaft 24 and which extends between the pair of balance cams 52 and 54. Balance cam follower 56 has a pair of opposed frustoconical balance follower surfaces 62 and 64, each of which engages a corresponding chamfered balance-surface 58 and 60 of pair of balance cams 52 and 54, respectively. Thus balance cam follower 56 axially oscillates in a longitudinal direction opposite cam follower 27 to counter balance a reaction force generated by oscillation of cam follower 27.

If the pair of balance cams (balance weight) are coaxially aligned on whichever of shaft 16 or 22 is the output shaft (shown in FIGS. 5a–b as follower shaft 24), the resultant reaction force vectors will also be aligned in the axial direction. Balance cam 52 will be separate from drive cams 20 and 22 so that torsional vibration is minimized. Preferably, and to meet the objectives of balance cams 52 and 54, the pair of drive cams 20 and 22 and the pair of balance cams 52 and 54 are out of phase with each other so that the corresponding cam follower 27 and balance cam follower 56 oscillate in opposite directions with respect to each other. Thus it is shown that in FIG. 5a, when assembly 50 is oriented so that follower shaft 24 and cam follower 27 are in a fully extended position, balance cam follower 56 is free to rotate and oscillate in an axially opposite direction (i.e. away from cam follower 27). However, in FIG. 5b, when assembly is oriented so that follower shaft 24 and cam follower 27 are in a fully retracted position, balance cam follower 56 is again rotating and oscillating in an axially opposite direction (i.e. toward cam follower 27). Note that, as in FIG. 1, a flat-on-shaft section 51 is coupled to follower shaft 24 so that knife implement 47 may oscillate back and forth during use, the flat-on-shaft section camming out on a non-circular housing opening (not shown) so that it is prevented from rotating during use.

Now referring to FIGS. 6a and 6b, a third embodiment of an in-line oscillating cam assembly 70 according to the present invention is disclosed. Like the embodiment shown in FIGS. 5a and 5b previously discussed, the embodiment of FIGS. 6a and 6b also includes a counterbalance in order to reduce any vibrational effect resulting from axial oscillation of follower shaft 24. The counterbalance also serves to drive a hedge trimming blade. Note that common components between this embodiment and the embodiment illustrated in FIG. 1 will be designated by like reference numerals.

Included as part of in-line oscillating cam assembly 70 is a balance shaft 72 which is spaced apart from cam shaft 16. Further, balance shaft 72 is parallel to cam shaft 16 and follower shaft 24, and lies on the side of cam shaft 16 opposite follower shaft 24. Also included in assembly 70 is a balance cam follower 74, which is rotatable about balance shaft 72. Balance cam follower 74 extends between pair of drive cams 20 and 22. Moreover, like cam follower 26, balance cam follower 74 has a pair of chamfered balance follower surfaces 76 and 78 which engage the chamfered surfaces 28 and 30, respectively, of the pair of drive cams. Thus, when cam shaft 16 is rotated, in addition to axially oscillating cam follower 24, balance cam follower 74 also axially oscillates in a longitudinal direction opposite to the direction of travel of cam follower 26. FIGS. 6a and 6b reflect each of the pair of drive cams 20 and 22 of assembly 70 out of phase 180° with respect to each other. Accordingly, FIG. 6a may reflect assembly 70 at some initial orientation, and FIG. 6b may reflect assembly 70 after cam shaft 16 has been rotated 180°.

FIG. 7 illustrates a hedge trimmer 80 incorporating another embodiment of the in-line oscillating cam assembly according to the present invention. In-line oscillating cam assembly 81 shown in FIG. 7 is similar to the assembly 50 previously disclosed in association with FIGS. 5a and 5b. Like components will again be designated by like reference numerals with and without prime designation. However, it is again contemplated that any of the embodiments of an in-line oscillating cam assembly disclosed or suggested herein are capable of being used in connection with hedge trimmer 80 or any other power tools, including those both shown representatively in any of the Figures of the drawings herein, as well as those not illustrated.

Hedge trimmer 80 includes housing 82, motor 84 which is affixed to housing 82, trigger 86, actuator switch 86 as well as the components discussed previously in association with FIGS. 5a and 5b. As shown, motor 84 generates the power to rotate gears 66 and 68. Cam shaft 16 is rotated, thereby turning pair of drive cams 20 and 22, and pair of balance cams 52 and 54. Note that, unlike assembly 50 of FIGS. 5a–b, drive cam 22 and balance cam 52 are spaced apart from each other and are not shown connected by connection member 53. The rotation of pairs of cams (20 and 22; and 52 and 54) on cam shaft 16 in turn cause follower member 26' and balance cam follower 56', respectively, to spin and axially oscillate with respect to follower shaft 87 (shown as a flat section), which is fixed at either end by stops 88 and 90. Follower shaft is otherwise unable to axially translate or oscillate. While not shown, cam followers 26' and 56', are appropriately fitted to that they may be rotatably mated to follower shaft 87. As is further shown in FIG. 7, the implement of hedge trimmer 80 consists of its dual blades 92 and 94 which are capable of oscillating out of phase with respect to each other, as a first hedge trimming blade 92 is attached to follower member 26' while second hedge trimming blade 94 is attached to balance cam follower 56', which correspondingly oscillates out of phase with respect to each other and in axially opposite directions with respect to each other. The attachment of trimming blades 92 and 94 to their respective cam followers 26' and 56' is by way of a forked attachment 96 wrapped around a center connector (not shown) between each of the pairs of cam followers.

Figure 8A:
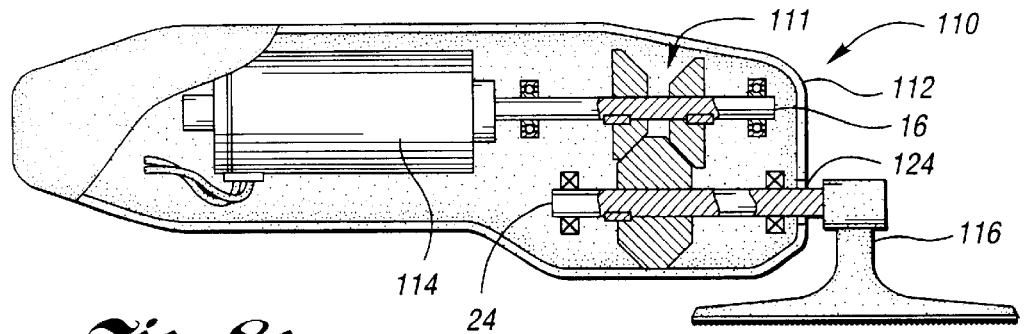
FIG. 8a illustrates a portable sanding tool incorporating an embodiment of the in-line oscillating cam assembly according to the present invention, the portable sanding tool having a sanding pad support.
Figure 8B:
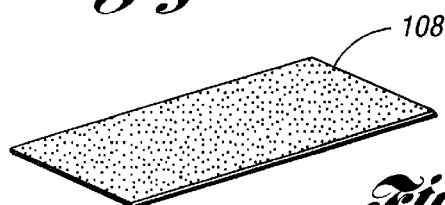
Figure 8C:
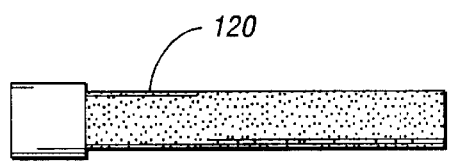
Figure 8D:
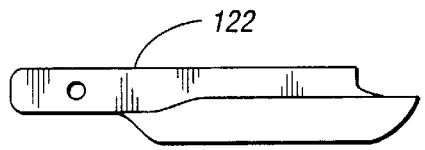

FIG. 8a illustrates a portable sanding tool 110 incorporating an embodiment of the in-line oscillating cam assembly 111 according to the present invention. Specifically, the cam assembly embodiment shown in FIG. 8a is similar to the first embodiment of power tool 10 previously disclosed in association with FIGS. 1–4. Portable sander 110 has a sander housing 112 to which motor 114, cam shaft 16 and follower 26 are supported. In this application, motor 114 generates power which rotates cam shaft 16 and drive cams 20 and 22 which are fixed to cam shaft 16. The rotation of drive cams 20 and 22 thereby causes cam follower 27 and follower shaft 24 to axially oscillate (as described in association with FIGS. 1–2) thereby moving sanding pad support 116, which is attached to one end of follower shaft 24. Portable sander 110 further includes a sheet of sanding paper 108, shown in FIG. 8b, attached to sanding pad support 116 by way of adhesive or the like. FIG. 8c illustrates that instead of sanding pad support 116, a sanding rod 120, shown to have a cylindrical sanding shaft, may be attached to the end of follower shaft 24, which may be useful in various applications where sanding pad support 116 is not. Lastly, FIG. 8d shows that a carving tool 122 (or gauging tool) can also be attached to the end of follower shaft 24. These tools are shown for example, and not limitation, to illustrate the multiple uses for the in-line oscillating cam assembly according to the present invention. As before, a flat-on-shaft output portion 124 is coupled to follower shaft 24 for attachment to implements 118, 120 and 122, to prevent rotation of these implements as previously described.

Figure 9:
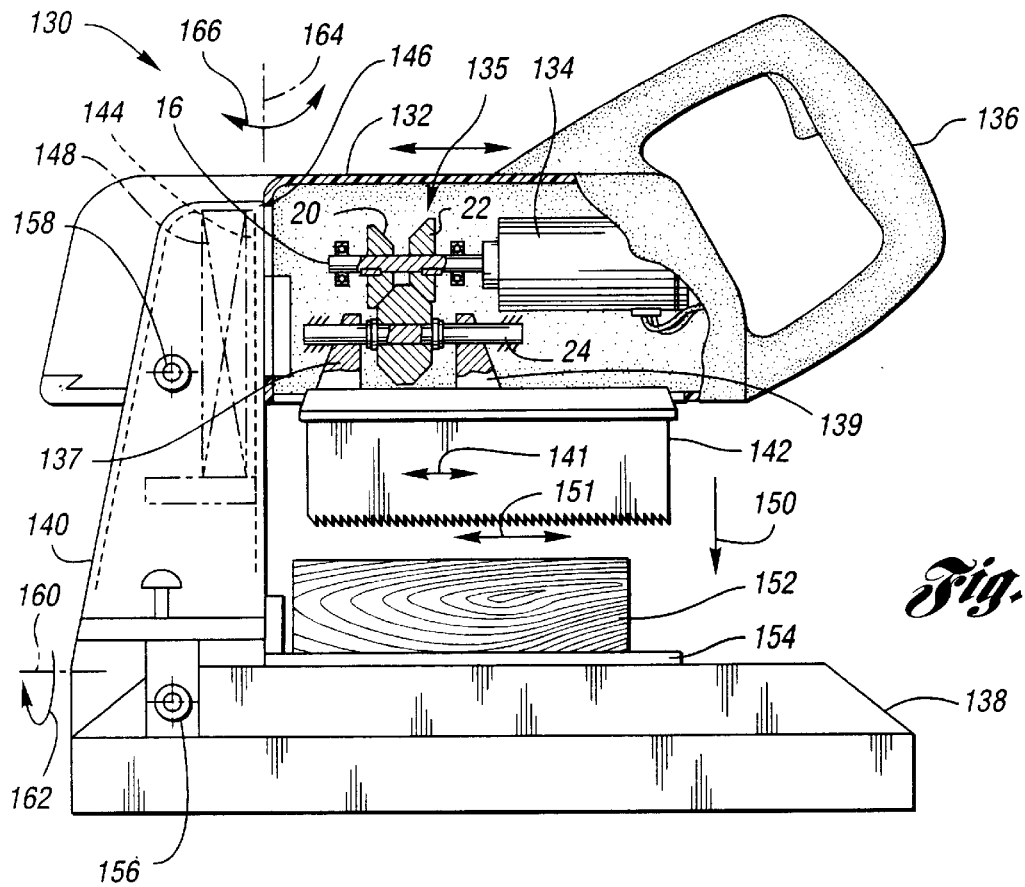
FIG. 9 illustrates a compound miter saw incorporating an embodiment of the in-line oscillating cam assembly according to the present invention.

Now, referring to FIG. 9, shown therein is a table-top flat blade compound miter saw 130. Miter saw 130 includes motor housing 132 containing therein a motor 134, and an in-line oscillating cam assembly 135, similar that previously disclosed as the first embodiment 10 in association with FIGS. 1–4 and accompanying text. Note that follower shaft 24, in addition to axially oscillating relative to motor housing 132, has coupled to it blade mounts 137 and 139. These blade mounts 137 and 139 attach a saw blade 142 to follower shaft 24 so that saw blade 142 is able to oscillate back and forth in conjunction with follower shaft 24 in a cutting motion as defined by arrow 141. Miter saw 130 includes a handle 136 attached to motor housing 132, a base 138, a column 140, a flat miter saw blade 142, and a guide assembly 144. Column 140 includes a channel 146 and a spring 148. In operation, handle 136 allows the user to lower motor housing 132 relative to column 140 in a direction illustrated by arrow 150 as well as in a transverse direction illustrated by arrow 151. Motor housing 132 is lowered along a predetermined path designated by guide assembly 144 in channel 146, with spring 148 providing sufficient bias for the user. A block of wood 152, disposed on miter table 154, is shown in a position for being sawed and otherwise worked by miter saw 130 at an angle perpendicular both to miter table 154 and to column 140. Miter saw 130, as a result of its compound nature, is also capable of sawing wood 152 from various compound angles as a result of having first and second pivots. Specifically, a first pivot allows motor housing 132 and column 140 to rotate around a horizontal longitudinal axis 160 (the rotation defined by arrow 162) and cut wood 152 at angles ranging from 0° to 180°. The first pivot is adjustable via knob 156. Additionally, a second pivot allows motor housing 132 to rotate around a vertical longitudinal axis 164 (the rotation defined by arrow 166) to saw wood 152. The second pivot is adjustable via knob 158. Miter saw 130 contemplates the application of in-line oscillating assembly 12 to heavy-duty stationary power tools, in addition to portable power tools previously discussed.

Figure 10:
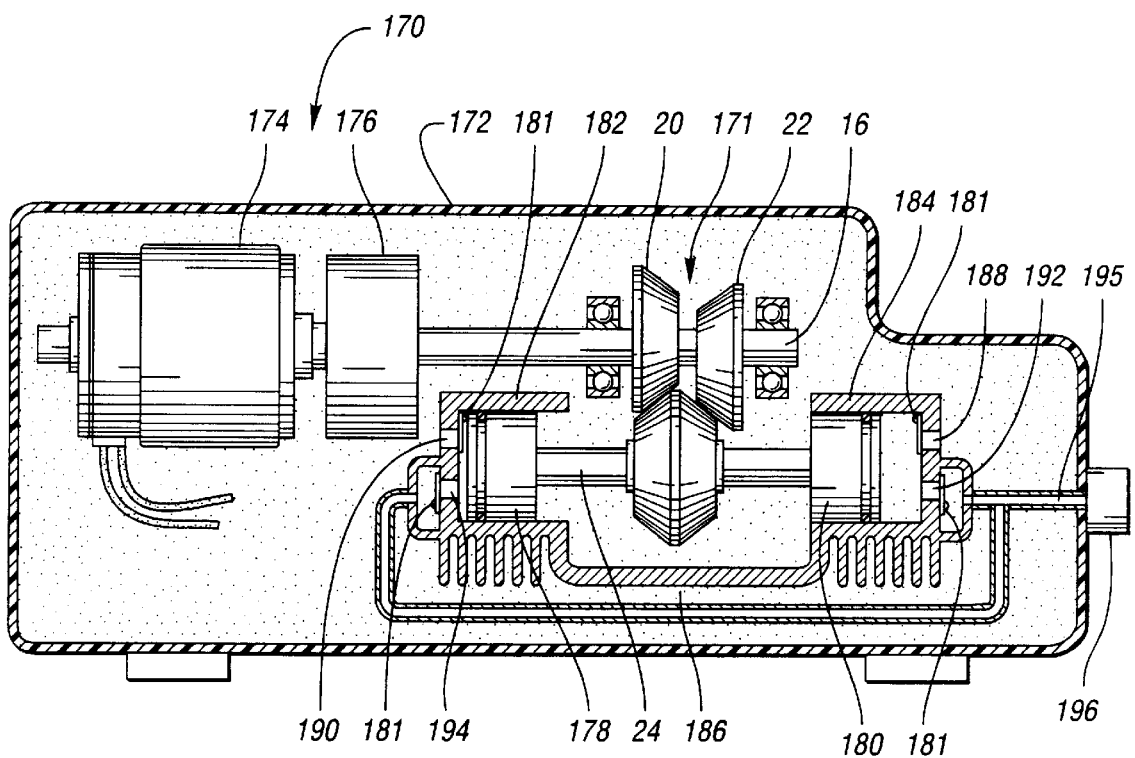
FIG. 10 illustrates an air compressor incorporating an embodiment of the in-line oscillating cam assembly according to the present invention.

FIG. 10 illustrates an air compressor 170 adapted to utilize an in-line oscillating cam assembly according to the present invention. Specifically, air compressor 170 utilizes an in-line oscillating cam assembly 171 similar to assembly 10 previously disclosed in association with FIGS. 1–4 and operating in a manner similar thereto. Air compressor 170 includes a housing 172, motor 174, coupling 176 which drivingly connects motor 174 to the cam shaft 16, first and second pistons 178 and 180, and corresponding piston housings 182 and 184. Further included is an air channel 186, first and second inlets 188 and 190, first and second exits 192 and 194 for releasing compressed air from within piston housings 182 and 184, respectively, and an outlet 195 having a nozzle 196. Each inlet and exit is covered by a reed valve 181 for controlling the flow of air.

In the operation of air compressor 170 of FIG. 10, motor 174 generates power which drives coupling 176 which in turn causes cam shaft 16 to rotate, thereby rotating drive cams 20 and 22 affixed to cam shaft 16. The rotation of drive cams 20 and 22 in turn causes cam follower 27, which is axially fixed to follower shaft 24, to axially oscillate first and second pistons 178 and 180 in piston housings 182 and 184, respectively. As shown in FIG. 10, pistons 178 and 180 are also fixed to follower shaft 24. The resultant compressed air is released from first piston housing 182 through exit 192 (covered by reed valve 181) where it proceeds through outlet 195 and nozzle 196 for release into the atmosphere. At the other end, compressed air is also released from piston housing 184 through exit 194, where it travels through channel 186 until it connects at outlet 195, where, along with the compressed air release from exit 192, is also released through nozzle 196 into the atmosphere.

Figure 11:
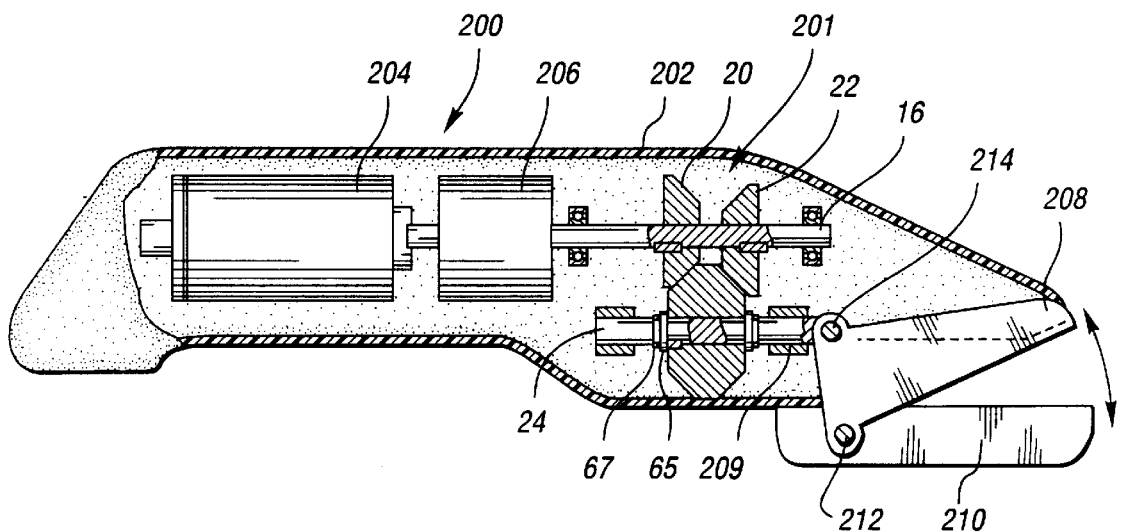
FIG. 11 illustrates a power scissors device incorporating an embodiment of the in-line oscillating cam assembly according to the present invention.

Referring now to FIG. 11, another illustrative application of the in-line oscillating cam assembly according to the present invention is shown adapted for use with a power scissors 200. Power scissors 200 includes housing 202, motor 204, coupling 206, upper blade 208, lower blade 210, first hinge 212', and second hinge 214. The in-line oscillating cam assembly 201 used in power scissors 200 is similar to that previously disclosed as the first embodiment 10 and operates in a manner similar to that described in association with FIGS. 2a–c. Motor 204 generates power which rotates coupling 206, which in turn rotates cam shaft 16, thereby causing drive cams 20 and 22, which are mounted on cam shaft 16, to rotate. The rotation of drive cams 20 and 22 in turn causes cam follower 26, to rotate on follower shaft 24. Cam follower 27 itself is axially fixed to follower shaft 24 by thrust washer 65 and snap ring 67 and is unable to oscillate thereon. However, the forces imposed upon cam follower 27, through thrust washer 65 and snap ring 67, cause follower shaft to axially oscillate in bushings 17. Upper blade 208 is hinged at two locations: first hinge 212 fixes upper blade 208 to lower blade 210, and second hinge 214 connects upper blade 208 to a flat on shaft portion 209 coupled to end of follower shaft 24. Thus, as follower shaft 24 axially oscillates, the translatory movement of follower shaft 24 causes upper blade 208 to pivot on second hinge 214 around first hinge 212. This results in upper blade 198 closing down on fixed lower blade 200 in an action similar to that of a pair of scissors.

Figure 12A:
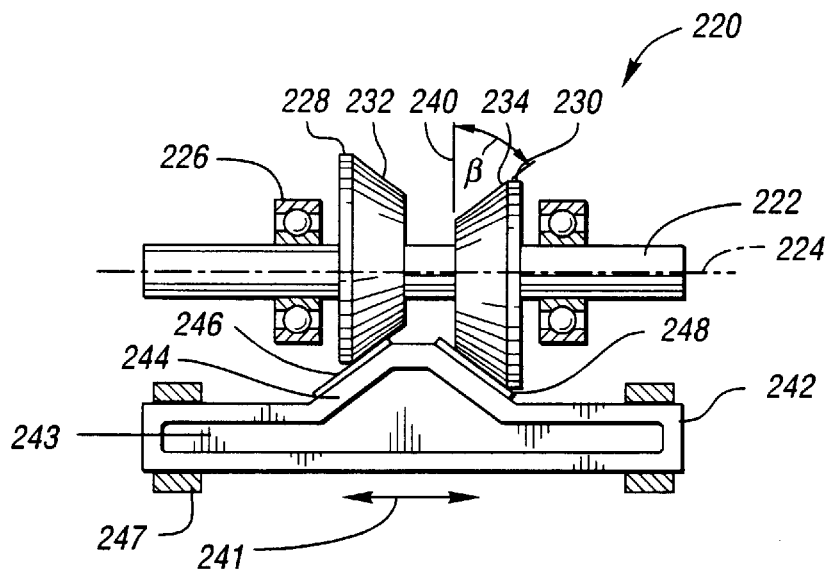
FIG. 12a illustrates a side elevational view of a fourth embodiment of an in-line oscillating cam assembly according to the present invention.
Figure 12B:
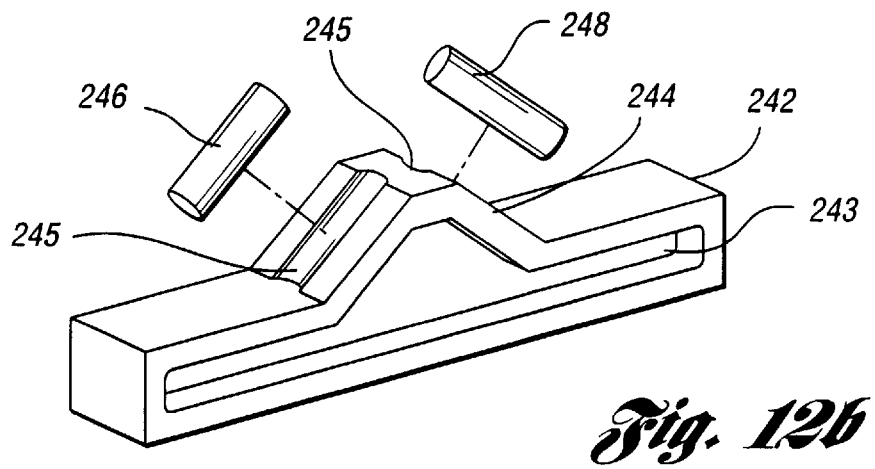

Referring now to FIGS. 12a and 12b, there is shown a fourth embodiment of an in-line oscillating cam assembly 220 according to the present invention. Assembly 220 includes cam shaft 222 having a longitudinal axis 224. Cam shaft 222 is supported upon a housing (not shown in FIG. 12a) by bearings 226. Cam shaft 222 is rotatable about longitudinal axis 224. Further shown in FIG. 12a is a pair of eccentric drive cams 228 and 230, which are longitudinally spaced apart from each other and mounted on cam shaft 222 eccentrically out of phase with each other. The pair of drive cams 228 and 230 have opposed circumferential chamfered surfaces 232 and 234 oriented at an inclined angle β (or opposed inclined angles +B and −B) relative a plane 240 perpendicular to longitudinal axis 224 of cam shaft 222.

Follower shaft 242 is spaced apart from and translates on an axis parallel to cam shaft 222, designated by arrow 241. Follower shaft is support on a housing (not shown) by bushings 247. Unlike previous embodiments, follower shaft 242 is not a cylindrical shaft but a hollowed out bar member (having hollowed portion 243). Follower member 244 is mounted to follower shaft 242 and extends between pair of drive cams 228 and 230. Follower member 244 has a pair of opposed follower surfaces 246 and 248 which engage chamfered surfaces 232 and 234, respectively, of pair of drive cams 228 and 230. Thus during operation, cam shaft 222 is rotated thereby contacting follower member 244 which causes follower shaft 242 to axially oscillate. Follower shaft 242 and follower member 244 are illustrated in more detail in FIG. 12b. Follower shaft 242 is shown having hollowed-out portion 243 thereby allowing for a lighter weight, and thus more versatile, assembly. Follower member 244 has grooves 245 formed therein for receiving opposed follower surfaces 246 and 248. Opposed follower surfaces 246 and 248 are each shown as a roller bearing positioned in groove 245 for contacting with mating chamfered surfaces 232 and 234.

Figure 13:
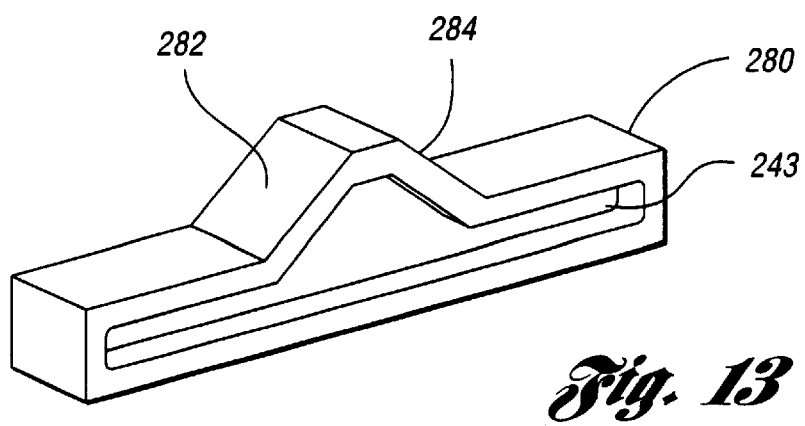
FIG. 13 illustrates a perspective view of a fifth embodiment of a follower shaft similar to that shown in FIGS. 12a and 12b, but without the roller bearing opposed follower surfaces positioned in a corresponding groove shown in FIGS. 12a and 12b.

A fifth embodiment of a follower member 280 is shown in FIG. 13. Follower member 280 is similar to follower member 242 illustrated in FIGS. 12a and 12b except that it does not include grooves formed therein for holding roller bearing follower surfaces. Thus if follower member 280 is substituted for follower member 242 in FIG. 12a, the angled surfaces 282 and 282 of follower member 280 are acted on directly by drive cams 228 and 230. This of course, would represent a less costly alternative to follower member 242.

Figure 14:
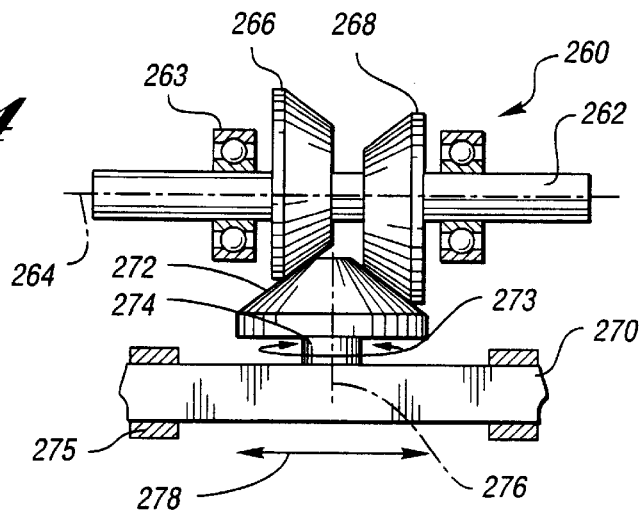
FIG. 14 illustrates a side elevational view of a sixth embodiment of an in-line oscillating cam assembly according to the present invention.

A sixth embodiment of an in-line oscillating assembly 260 according to the present invention is set forth in FIG. 14. Assembly 260 includes a cam shaft 262 having longitudinal axis 264 and a pair of eccentric drive cams 266 and 268 mounted eccentrically out of phase with respect to each other. Cam shaft 262 is rotatably mounted relative to a housing (not shown) via bearings 263. In assembly 260, follower shaft 270 is shown as flat portion or bar member, but of course may be a cylindrical shaft like cam shaft 16 of previous embodiments. Follower shaft 270 has mounted to it a follower member 272, which is a frustoconical member having a mounting shaft 274 for directly mounting follower member 272 to follower shaft 274. Mounting shaft 274 has an axis 276 substantially perpendicular to the axis of travel (defined by arrow 278) of follower shaft 274. It is around axis 276 that follower member 272 is freely rotatable in either direction as indicated by the arrow 273. Follower member is further movable relative to a housing (not shown) by way of bushings 275. In operation, cam shaft 262 rotates thereby causing pair of drive cams 266 and 268 to rotate out of phase. The drive cam rotation thereby causes follower member 262 to rotate in either direction, depending upon which of drive cams is bearing upon it at that moment. As follower member rotates 272, the force vectors impose upon it cause follower shaft to axially oscillate back and forth as indicated by arrow 278.

Figure 15A:
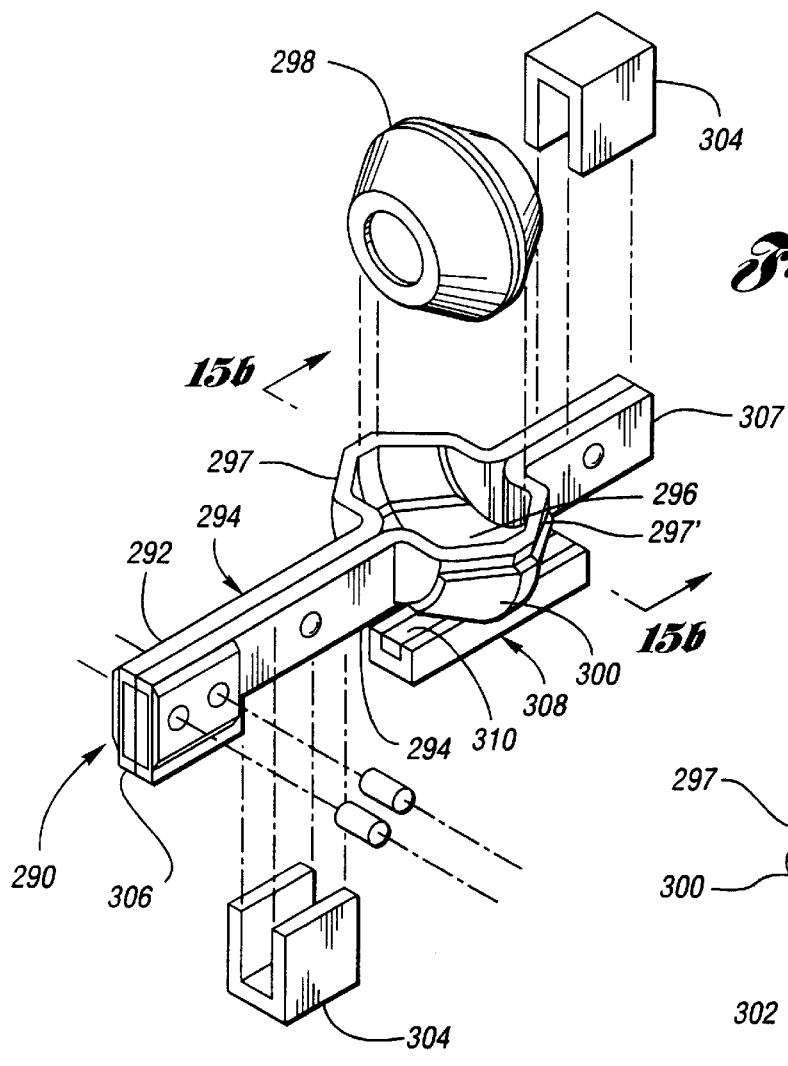
FIG. 15a illustrates perspective view of a seventh embodiment of an in-line oscillating cam assembly according to the present invention.
Figure 15B:
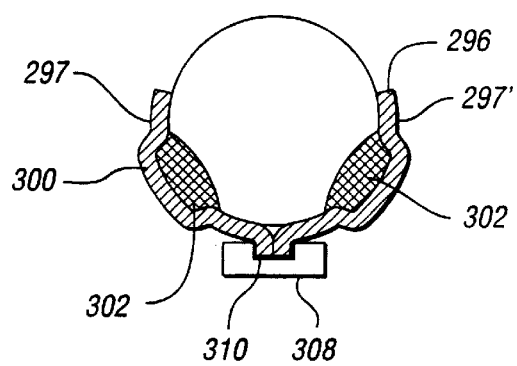
FIG. 15b illustrates a cross-section of the pocket of the assembly of FIG. 15a, taken along the line 15b—15b of FIG. 15a, further showing spaces for lubricant for the cam follower.

A seventh embodiment according to the present invention is illustrated in FIGS. 15a and 15b. As shown therein, a two-piece stamped steel follower member 290 is provided. Follower shaft 290 is formed from a mirror image two-piece stamping 292 and 293. The two-pieces are assembled together using a welding, punching and clip method. A stamped pocket 296 is formed by the mating of pocket portions 297 and 297' of mating of pieces 292 and 293. Within stamped pocket 296, a cam follower 298 is supported. FIG. 15b, which is taken along the line 15b–15b of FIG. 15a, illustrates a cross-sectional view of stamped pocket 296. As shown therein, within stamped pocket 296 there are spaces 300 for holding grease 302 or other lubricant for allowing cam follower 298 to freely spin. Also provided in FIG. 15a are bushings 304 upon which follower shaft 290 may be supported onto housing (not shown in FIG. 15a). Further, it is contemplated that the mating stamped shaft halves 292 and 293 also serve together as a tool-holding end 306 for holding a linear-moving saw blade such as those illustrated previously in FIGS. 1 and 5a–b. The end opposite tool-holding end 306 is designated end 307. In order to further reduce reciprocating mass, tool-holding end 306 may be shortened by eliminating bushings 304 and the associated portions of shaft halves 292 and 293; tool-holding end 306 may even be truncated completely up to where it mates with pocket 296. End 307 may be treated correspondingly. A slide 308 having a channel 310 can be provided to align shaft 294 along the reciprocating axis, as shown in FIGS. 15a and 15b.

It is recognized that the in-line oscillating cam assembly according to the present invention is in no manner limited in use to the applications shown in FIGS. 1 and 7–11. These tools and applications are only illustrative of the broad range of uses to which the assembly can be applied. While the best modes for carrying out the invention have been described in detail, those familiar with the art to which this invention relates will recognize various alternative designs and embodiments for practicing the invention as defined by the following claims.

What is claimed is:

1. A portable power tool comprising:

a housing;

an implement having an oscillating power input;

a motor supported upon the housing;

a cam shaft having a longitudinal axis, the cam shaft rotatable about the longitudinal axis by the motor;

a pair of eccentric drive cams longitudinally spaced apart from each other and mounted on the cam shaft eccentrically out of phase, the pair of drive cams having opposed circumferential chamfered surfaces oriented at an inclined angle relative a plane perpendicular to the longitudinal axis of the cam shaft;

a follower shaft spaced apart from and parallel to the cam shaft; and a cam follower longitudinally fixed to the follower shaft and extending between the pair of drive cams, the cam follower having a pair of opposed frustoconical follower-surfaces engaging the chamfered surfaces of the pair of drive cams, whereby rotating one of the cam shaft and follower shaft causes the other one of the cam shaft and follower shaft to axially oscillate, wherein one of the cam shaft and the follower shaft is coupled to the oscillating power input of the implement.

2. The portable power tool of claim 1 wherein the pair of drive cams have opposed frustoconical circumferential chamfered surfaces.

3. The portable power tool of claim 1, wherein the implement is a knife blade.

4. The portable power tool of claim 1, wherein the implement is a miter saw blade.

5. The portable power tool of claim 1, wherein the implement is a sanding rod.

6. The portable power tool of claim 1, wherein the implement is a carving tool.

7. The portable power tool of claim 1, wherein the implement is a pair of scissor blades, at least one of the pair of scissor blades coupled to the follower shaft and pivotably movable relative to the other of the pair of scissor blades.

8. The portable power tool of claim 1, wherein the implement is an air compressor piston.

9. The portable power tool of claim 1, wherein the implement is a hedge trimming blade.

10. The portable power tool of claim 1, further comprising:

a pair of eccentric balance cams longitudinally spaced apart from each other and from the pair of drive cams and mounted therewith on the cam shaft eccentrically out of phase, the balance cams having opposed circumferential chamfered balance-surfaces inclined relative to a plane between the balance cams located perpendicular to the longitudinal axis of the cam shaft; and a balance cam follower rotatable about the drive shaft and extending between the balance cams, the balance cam follower having a pair of opposed frustoconical balance surfaces engaging the chamfered balance-surfaces of the pair of balance cams so that the balance cam follower axially oscillates in a longitudinal direction opposite the cam follower to counter balance a reaction force generated by oscillation of the cam follower.

11. The portable power tool of claim 1, wherein the cam shaft is provided with the oscillating power input.

12. The portable power tool of claim 1 further comprising:

a balance shaft spaced apart from and parallel to the drive shaft on a side opposite the follower shaft; and a balance cam follower rotatable about the balance shaft and extending between the pair of drive cams, the balance cam follower having a chamfered balance-surface engaging the chamfered surfaces of the pair of drive cams, whereby rotating the cam shaft further causes the balance cam follower to axially oscillate in a longitudinal direction opposite to that of the cam follower.

13. The portable power tool of claim 1, wherein the inclined angle of the drive cam chamfered surfaces is +β° and −β° and the corresponding follower surfaces are inclined at −β° and +β° where β is within a range of 20°–70°.

14. The portable power tool of claim 1, wherein the inclined angle of the drive cam chamfered surfaces is +β° and −β° and the corresponding follower surfaces are inclined at −β° and +β° where β is within a range of 40°–60°.

15. A portable power tool comprising:

a housing;

an implement having an oscillating power input;

a motor supported upon the housing;

a cam shaft having a longitudinal axis, the cam shaft rotatable about the longitudinal axis by the motor;

a pair of eccentric drive cams longitudinally spaced apart from each other and mounted on the cam shaft eccentrically out of phase, the pair of drive cams having opposed circumferential chamfered surfaces oriented at an inclined angle relative a plane perpendicular to the longitudinal axis of the cam shaft;

a follower shaft spaced apart from and parallel to the cam shaft;

a cam follower longitudinally fixed to the follower shaft and extending between the pair of drive cams, the cam follower having a pair of opposed frustoconical follower-surfaces engaging the chamfered surfaces of the pair of drive cams, whereby rotating one of the cam shaft and follower shaft causes the other one of the cam shaft and follower shaft to axially oscillate, wherein one of the cam shaft and the follower shaft is coupled to the oscillating power input of the implement;

a pair of eccentric balance cams longitudinally spaced apart from each other and from the pair of drive cams and mounted therewith on the cam shaft eccentrically out of phase, the balance cams having opposed circumferential chamfered balance-surfaces inclined relative to a plane between the balance cams located perpendicular to the longitudinal axis of the cam shaft; and a balance cam follower rotatable about the drive shaft and extending between the balance cams, the balance cam follower having a pair of opposed frustoconical balance surfaces engaging the chamfered balance-surfaces of the pair of balance cams so that the balance cam follower axially oscillates in a longitudinal direction opposite the cam follower to counter balance a reaction force generated by oscillation of the cam follower.

16. A portable power tool comprising:

a housing;

an implement having an oscillating power input;

a motor supported upon the housing;

a cam shaft having a longitudinal axis, the cam shaft rotatable about the longitudinal axis by the motor;

a pair of eccentric drive cams longitudinally spaced apart from each other and mounted on the cam shaft eccentrically out of phase, the pair of drive cams having opposed circumferential chamfered surfaces oriented at an inclined angle relative a plane perpendicular to the longitudinal axis of the cam shaft;

a follower shaft spaced apart from and parallel to the cam shaft;

a cam follower longitudinally fixed to the follower shaft and extending between the pair of drive cams, the cam follower having a pair of opposed frustoconical follower-surfaces engaging the chamfered surfaces of the pair of drive cams, whereby rotating one of the cam shaft and follower shaft causes the other one of the cam shaft and follower shaft to axially oscillate, wherein one of the cam shaft and the follower shaft is coupled to the oscillating power input of the implement;

a balance shaft spaced apart from and parallel to the drive shaft on a side opposite the follower shaft; and a balance cam follower rotatable about the balance shaft and extending between the pair of drive cams, the balance cam follower having a chamfered balance-surface engaging the chamfered surfaces of the pair of drive cams, whereby rotating the cam shaft further causes the balance cam follower to axially oscillate in a longitudinal direction opposite to that of the cam follower.

* * * * *